UNITED STATES PATENT OFFICE.

DUNCAN MACFARLAN, OF PHILADELPHIA, PENNSYLVANIA.

COMPOSITION OF MATTER FOR ELECTRIC CONDUCTORS.

SPECIFICATION forming part of Letters Patent No. 526,722, dated October 2, 1894.

Application filed May 19, 1894. Serial No. 511,854. (No specimens.)

*To all whom it may concern:*

Be it known that I, DUNCAN MACFARLAN, a citizen of the United States, residing at the city of Philadelphia, in the county of Philadelphia and State of Pennsylvania, have invented certain new and useful Improvements in Conducting and Resisting Compound Structures for Electric Currents, of which the following is a specification.

My invention has relation to the production of a baked conducting and resisting compound structure for controlling the currents of an electric source of energy.

The principal objects of my invention are, first, to provide a baked compound conducting and resisting structure for regulating or controlling electric currents; second, to provide a baked structure composed of earthy matter having combined therewith substances which become part thereof and when formed into a structure, the same will in a circuit control the voltage thereof; and, third, to provide a baked compound structure which in a circuit is adapted to control the resistance offered thereby to a current of high voltage and which can be graduated in such manner as that the current becomes practically imperceptible and can be increased at will from such condition thereof to the maximum limit of energy of the circuit from a source of energy.

My invention consists of the improvements substantially as hereinafter described and claimed.

In order that my invention may be understood by those skilled in electric science, to which the same is applicable, I will now proceed to describe the structure and some of the methods by which my invention may be carried into effect.

I have practically demonstrated that earthy matter, such as clay, kaolin or other somewhat similar substances of a mineral nature having inherent resisting properties when combined with certain other substances having inherent conducting properties, will in an electric circuit, offer such resistance as to permit of the control of the same within the maximum capacity thereof and permit of a safe use of the current for various purposes. For example, with say a voltage of one thousand or more or in fact any voltage, it is possible as practice has demonstrated to reduce the current to the fractional part of a volt instantly and to increase the same at pleasure therefrom, with perfect safety in the use of a compound structure of my invention. Moreover, that while such a structure will heat up to some extent in the flow of the current therethrough or about the same, yet such a structure is indestructible in a path of electric energy.

In the practice of my invention good results have been obtained by the use of the following materials and in about the proportions of each as specified hereunder.

Black lead, thirty per cent.; clay, forty-five per cent.; water, twenty-five per cent.

Graphite, twenty-five per cent.; kaolin, fifty per cent.; water, twenty-five per cent.

Black lead, thirty per cent.; chloride of aluminium, ten per cent.; clay, forty per cent.; water, twenty per cent.

Graphite, thirty-five per cent.; kaolin, forty per cent.; water, twenty-five per cent.

Graphite, ten per cent.; silver, ten per cent.; clay, fifty per cent.; silicate, ten per cent.; water, twenty per cent.

Graphite, twenty-five per cent.; silicate of soda, fifteen per cent.; water, twenty-five per cent.; kaolin, thirty-five per cent.

Graphite, twenty-five per cent.; clay, forty per cent.; cement, ten per cent.; water, twenty-five per cent.

Graphite, ten per cent.; kaolin, thirty-five per cent.; asphalt or coal tar, ten per cent.; chloride of aluminum, ten per cent.; cement, ten per cent.; water, twenty-five per cent.

Any of the above conducting materials employed with earthy matter, such as kaolin, clay, cement or other substances allied in constitution and chemical affinities thereto are adapted to homogenize with said materials under the influence of a binder employed therewith by pressure and baking to constitute a structure which in a circuit is adapted to offer such resistance to the current as to permit of the perfect control or regulation of the same.

It may be here remarked that while certain materials have been mentioned combined in certain proportions, one with the other, yet my invention is not limited to the exact proportions of each as hereinbefore stated.

Having thus described the nature and objects of my invention, what I claim as new, and desire to secure by Letters Patent, is—

A baked compound structure, consisting of graphite, clay, asphalt or coal tar, chloride of aluminum and a binder, substantially as described.

In testimony whereof I have hereunto set my signature in the presence of two subscribing witnesses.

DUNCAN MACFARLAN.

Witnesses:
 THOMAS M. SMITH,
 RICHARD C. MAXWELL.